(12) United States Patent
Schlagel et al.

(10) Patent No.: US 6,695,988 B1
(45) Date of Patent: Feb. 24, 2004

(54) METHOD AND APPARATUS FOR WASHING OR HYDRATION OF OPHTHALMIC DEVICES

(75) Inventors: Mark E. Schlagel, Jacksonville, FL (US); Michael F. Widman, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 54 days.

(21) Appl. No.: 09/818,725

(22) Filed: Mar. 27, 2001

Related U.S. Application Data

(63) Continuation-in-part of application No. 09/252,307, filed on Feb. 18, 1999, now Pat. No. 6,207,086.

(51) Int. Cl.[7] .............................................. B29D 11/00
(52) U.S. Cl. ......................... 264/2.6; 134/34; 134/105; 134/901; 425/445; 425/446
(58) Field of Search ................... 264/1.1, 2.6; 425/808, 425/445, 446; 134/25.1, 25.5, 34, 105, 107, 901

(56) References Cited

U.S. PATENT DOCUMENTS

| | | |
|---|---|---|
| 1,681,839 A | 8/1928 | Breton |
| 4,375,992 A | 3/1983 | Stevens et al. |
| 4,495,313 A | 1/1985 | Larsen ........................ 523/106 |
| 4,640,489 A | 2/1987 | Larsen ........................ 249/122 |
| 4,680,336 A | 7/1987 | Larsen et al. ................ 524/548 |
| 4,761,069 A | 8/1988 | Truong et al. ........... 351/160 H |
| 4,782,946 A | 11/1988 | Pollak ........................ 206/223 |
| 4,889,664 A | 12/1989 | Kindt-Larsen et al. ....... 264/2.6 |
| 5,036,971 A | 8/1991 | Seden et al. |
| 5,039,459 A | 8/1991 | Kindt-Larsen et al. ........ 264/2.6 |
| 5,080,839 A | 1/1992 | Kindt-Larsen ............... 264/2.6 |
| 5,094,609 A | 3/1992 | Kindt-Larsen .............. 425/445 |

(List continued on next page.)

FOREIGN PATENT DOCUMENTS

| | | | |
|---|---|---|---|
| EP | 0 453 231 A | 10/1991 | |
| EP | 0 453 232 A | 10/1991 | |
| EP | 0 686 488 B1 | 12/1995 | ........... B29D/11/00 |
| EP | 0 740 988 A | 11/1996 | |
| EP | 806 286A2 A3 | 11/1997 | ........... B29D/11/00 |
| EP | 0 824 063 A3 | 2/1998 | ........... B29D/11/00 |
| EP | 0 824 063 A2 | 2/1998 | ........... B29D/11/00 |
| EP | 1 048 443 A2 | 11/2000 | |
| GB | 2 040 213 A | 8/1980 | |
| GB | 2 237 241 A | 5/1991 | |
| WO | WO 97/13635 | 4/1997 | ........... B29D/11/00 |
| WO | WO 00/12296 | 3/2000 | ........... B29D/11/00 |
| WO | Wo 00/13882 | 3/2000 | ........... B29D/11/00 |
| WO | WO01/32408 A2 | 5/2001 | |

OTHER PUBLICATIONS

European Search Report 00301249.9–1253– dated Jul. 19, 2002.

*Primary Examiner*—Mathieu D. Vargot

(57) ABSTRACT

This invention discloses an apparatus and method for hydrating or washing ophthalmic devices, comprising the step of directing to an ophthalmic device having a higher concentration of impurities fluid which has previously been directed to ophthalmic device having a lower concentration of impurities. Further, this invention provides a preferred device supporting member.

13 Claims, 11 Drawing Sheets

U.S. PATENT DOCUMENTS

| | | |
|---|---|---|
| 5,143,101 A * | 9/1992 | Mor |
| 5,172,450 A | 12/1992 | Cole et al. |
| 5,264,161 A | 11/1993 | Druskis et al. ............... 264/2.6 |
| 5,271,875 A | 12/1993 | Appleton et al. ............ 264/2.3 |
| 5,407,062 A | 4/1995 | Shannon et al. |
| 5,476,111 A | 12/1995 | Andersen et al. ......... 134/58 R |
| 5,490,959 A | 2/1996 | Nunez et al. ................. 264/2.6 |
| 5,524,419 A | 6/1996 | Shannon |
| 5,616,184 A | 4/1997 | Duncan et al. ............ 134/22.1 |
| 5,640,980 A | 6/1997 | Keene et al. ............ 134/58 R |
| 5,649,410 A | 7/1997 | Martin et al. ................. 53/474 |
| 5,690,866 A | 11/1997 | Andersen et al. ............. 264/2.6 |
| 5,706,634 A | 1/1998 | Edwards et al. ............... 53/473 |
| 5,722,536 A | 3/1998 | Pierce et al. .................. 206/5.1 |
| 5,762,081 A | 6/1998 | Keene et al. .................. 134/59 |
| 5,804,107 A | 9/1998 | Martin et al. |
| 5,836,323 A | 11/1998 | Keene et al. .................. 134/58 |
| 5,914,074 A | 6/1999 | Martin et al. |
| RE36,302 E | 9/1999 | Kindt-Larsen et al ...... 425/445 |
| 6,039,899 A | 3/2000 | Martin et al. |
| 6,068,798 A | 5/2000 | Lesczynski et al. ......... 264/2.6 |
| 6,393,652 B1 * | 5/2002 | Vogt |

* cited by examiner

METHOD AND APPARATUS FOR WASHING OR HYDRATION OF OPHTHALMIC DEVICES

This application is a continuation-in-part of Shlagel et al., U.S. Ser. No. 09/252,307, filed Feb. 18, 1999, now U.S. Pat. No. 6,207,086, having the same title and incorporated herein by reference.

FIELD OF THE INVENTION

The present invention relates to a method and apparatus for washing or hydration of ophthalmic devices.

BACKGROUND OF THE INVENTION

The molding of hydrophilic contact lenses is known. Various processes are disclosed in U.S. Pat. No. 4,495,313, to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention.

These prior art references disclose a contact lens production process wherein each lens is formed by molding a reactive mixture in a lens mold, typically between a front curve (lower mold section) and back curve (upper mold section). The monomer injected in the molds is polymerized, thus forming a lens. The lens is typically subjected to a hydration bath, and then to multiple leaching steps which remove processing chemicals (leachable diluents and monomers) from the lens. Multiple lenses are immersed in the hydration bath, which removes the lenses from the front curve mold. Once demolded, the lenses are advanced into a multi-step washing phase and then the lenses, while still wet, are removed from the washing phase and are packaged for consumer use.

In the earlier manufacturing processes for making contact lenses, the steps of hydration and diluent removal took place in large tanks. Hundreds of contact lenses were put in each tank and moved around the tank and then removed. By in-flow and out-flow streams, the tanks would be kept at a specified equilibrium level of diluent. There were several tanks with decreasing levels of diluent in which the contact lenses were soaked in sequence until they reached the equilibrium level of diluent. The contact lenses would be moved from one tank to the next until the level of diluent was below or at an acceptable level. Occasionally the tanks would be emptied for cleaning, and then refilled with clean water.

U.S. Pat. Nos. 5,080,839 and 5,094,609 disclose, respectively, a process for hydrating and washing contact lenses and a chamber for washing the contact lenses formed with a monomer or monomer mixtures of the type disclosed in the foregoing patents. The process disclosed in these patents was a significant advance; however, the transfer of lenses from the hydration phase to the washing step and the associated handling of the lenses resulted in the loss of some lenses. Plus, washing required large amounts of water and occurred in multiple soaking steps. The chamber holding the contact lens was filled with water, then after the contact lens and $H_2O$ reached equilibrium, the chamber was emptied and the steps were repeated.

As should be apparent, it would be desirable to make the hydration step more efficient, that is, to subject as many lenses as possible to hydration in the most efficient manner, using the least water possible.

BRIEF DESCRIPTION OF THE INVENTION

In accordance with the invention, a hydration and/or washing, e.g. diluent removal, apparatus and process is disclosed in which a plurality of device-supporting members are provided preferably having one or more cavities each for containing an ophthalmic device, such as a contact lens and/or lens mold and/or reusable lens mold, and/or intraocular lens. The ophthalmic devices are arranged so that the hydration or cleansing fluid flows or is directed from contacting cleaner ophthalmic devices to contacting dirtier ophthalmic devices. The device-supporting members can be arranged in any configuration so that the hydration or cleansing fluid contacts cleaner and then dirtier ophthalmic devices. The device-supporting members can be arranged vertically: in-line like a column or like a stair-case, horizontally, helically or combinations of the above. For example, the fluid could flow horizontally from ophthalmic device to ophthalmic device on a first level of one or more device-supporting members arranged is horizontally and then flow vertically down and across to a second level of one or more device-supporting members located beneath the first level, and then flow to a third level, etc. Alternatively, ophthalmic devices can be moved within a column in which the water falls like rain, or in a horizontal pipe through which a stream of fluid is pumped. Preferably the arrangement is at least partially vertical so that the hydration or cleansing fluid moves under gravity and does not have to be pumped. The hydration or cleansing fluid can be directed to move in a single stream from the cleanest ophthalmic device to the dirtiest ophthalmic device in the apparatus. Alternatively, the fluid can be directed to move in multiple streams from one or more of the cleanest ophthalmic devices to one or more of the dirtiest ophthalmic devices in the apparatus. The flow of fluid can be across ophthalmic devices and device-supporting members or it can be through or both across and through the device-supporting members. Preferably, multiple streams of the hydration or cleansing fluid can be directed to flow onto and across only ophthalmic devices in particular locations from clean to dirty ophthalmic devices in the apparatus. Preferably, the fluid flows across the device-supporting members. If desired, additional fluid can be injected at one or more locations in the apparatus. The cleanest ophthalmic devices from the apparatus are removed at or near, that is in the vicinity of the input of clean hydration or cleansing fluid into the apparatus, and dirty ophthalmic devices are inserted into the apparatus preferably just before or in the vicinity of where the dirtiest hydration or cleansing fluid exits the apparatus.

The preferred hydration and/or washing apparatus and process comprises trays as the device-supporting members. However, the device-supporting members can have any configuration, which provides protection for and maintains the ophthalmic device but allows fluid to flow to, and around or over the ophthalmic device in or on the device-supporting member, and then allows the fluid to flow out of the device-supporting member. Other examples of device-supporting members include a plastic cage, bowl, or the hydration and washing chambers for contact lenses used and disclosed in the prior art. It is further preferred that the device-supporting member can be easily moved through the apparatus countercurrent to the flow of the fluid. In the preferred embodiment, the device-supporting member is a lens supporting member, and the preferred lens supporting member is a tray. The preferred- trays have a plurality of cavities each for containing an ophthalmic device, and preferably for containing a front curve mold with a contact lens in the mold. The following description will focus on the preferred embodiment involving the washing and hydration of contact lenses; however, other devices, particularly other ophthalmic devices may be substituted for the contact lenses in the description.

In the preferred embodiment, the trays are stacked vertically with the cavities (and lenses) in columns. The hydration or cleansing fluid, for example, de-ionized (DI) water, is injected or otherwise introduced into each of the cavities of the leading or upper tray. The fluid injected in each cavity flows downwardly through the stack of cavities of the column to wash over the lenses preferably in the front curve molds in the trays below the point where the fluid is injected. If desired, additional fluid also can be injected at one or more lower trays in the stack. In using the apparatus, a tray is inserted at the stack bottom, the stack is raised, and the uppermost tray in the stack is removed. The addition and removal of trays to the stack is carried out in a step-wise manner.

As lenses (in the trays) move upwardly in the stack, they encounter increasingly purer (less contaminated) hydration or cleansing fluid. The more contaminated fluid contacts the is lenses at lower positions in the stack, but is still able to remove contaminants.

There is a counter-current effect, that is, the fluid flows downwardly in the apparatus and the trays with lenses move progressively upward. A vertical configuration is preferred, because the fluid flows down; however, other configurations, including horizontal, in which the fluid is pumped can be used. As the fluid flows from cleaner to dirtier lenses, it picks up the impurities from the lenses. As the lenses move toward the inlet of clean fluid, they have fewer impurities. Preferably, the concentration of impurities in the fluid is always less than the concentration of impurities in the lenses which it is contacting.

According to one aspect of the invention, a method for hydrating or washing ophthalmic devices includes the steps of applying to an ophthalmic device, which has a higher concentration of impurities, a fluid which has previously been applied to ophthalmic devices having a lower concentration of impurities, said fluid having previously been applied to ophthalmic devices having an even lower concentration of impurities. At least a portion of the same fluid preferably is applied to at least 10, more preferably at least 25 ophthalmic devices, most preferably more than 35, e.g. contact lenses, which have substantially sequentially increasing amounts of impurities. For example, lenses having high concentrations of impurities can be lenses having greater than 10,000 ppm, or even greater than 100,000 ppm diluent or other impurities in the lens, and lenses having low concentrations of impurities can be lenses having less than 10 ppm, more preferably less than 1 ppm diluent or other impurities in the lens. Preferably the same fluid, or at least a portion of the same fluid, which is applied to contact lenses having a low concentration of impurities is later applied to contact lenses having a high concentration of impurities. Preferably the is contact lenses move countercurrently to the fluid, and/or (preferably and) the fluid moves countercurrently to the lenses. Preferably, the flow of the fluid is directed from lenses having lower concentrations of impurities to lenses having higher concentrations of impurities, such that the amount of impurities in the fluid increases as the fluid is directed at contact lenses having increasing amounts of impurities. It is preferred that the concentration of impurities in the fluid is such that, a concentration gradient between the level of impurities in the fluid and the lenses is substantially maintained, such that impurities substantially continuously or successively, for example, in stages e.g. at the different levels in the stack, move into the fluid from the cleaner contact lenses and then from the contact lenses having increasingly higher levels of impurities. Preferably the impurities move substantially continuously from the contact lenses into the fluid. The contact lenses enter the apparatus of this invention with a high concentration of impurities and are preferably subjected to increasingly cleaner fluid as the contact lenses become increasingly cleaner. The lenses having the lowest concentration of impurities of any lenses contacting any fluid in this method, have clean, preferably the cleanest, fluid directed at them. In the preferred embodiment the lenses move in stages and the fluid flows continuously or semi-continuously, e.g. in pulses of fluid, countercurrently relative to the movement of the lenses; however, the lenses could also move continuously or semi-continuously countercurrently relative to the movement of the fluid, or both. In this method, the lenses are preferably contained in lens supporting members. In the preferred embodiment, the lenses are in trays, with the trays arranged in a vertical stack. Preferably there are multiple lenses in each tray; however, the trays can be made to hold individual lenses. The concentration of impurities in the lenses in the vertically arranged trays decreases as the lenses advance toward the top of the stack. The fluid is clean at the top of the stack and exits at the bottom of the stack with a high concentration of impurities.

In accordance with another aspect of the invention, a hydrating or washing method includes the steps of vertically arranging, e.g. stacking, a plurality of device-supporting members each having at least one a cavity containing an ophthalmic device, and injecting a fluid into the cavity or cavities of an upper device-supporting member, the fluid flowing downwardly through the cavities. In the preferred form, the downward flow of fluid is directed to a lens contained in the cavity of a lower tray in a stack of trays. Also, the trays can be aligned above one another to define a flow path therebetween.

In accordance with another aspect of the invention, a device-supporting member for use in a washing or hydration apparatus is provided which comprises a cavity. The preferred device-supporting member comprises a support and cavity insert, preferably multiple cavity inserts which fit into the support. The benefit of this configuration is that the cavity inserts can be easily replaced in the support if one of them breaks which limits the loss and expense if there is damage to a device-supporting member. Alternatively, the entire device-supporting member and/or the inserts could be injection molded, which also limits the loss and expense if there is damage to a device-supporting member as compared to a machined plastic or formed metal device-supporting member or cavity insert.

In accordance with another aspect of the invention, an apparatus for hydrating or washing contact lenses includes a means for applying fluid to a lens having a low concentration of impurities, and a means for directing the applied fluid to further lenses which have a comparatively higher concentration of impurities.

According to a still further aspect of the invention, a hydrating or washing apparatus for contact lenses includes a plurality of trays each containing a lens, wherein the trays are vertically stacked, with the cavities arranged in a vertical column. Each cavity has an opening which permits fluid to flow to the cavity of a next lower tray in the stack to thereby wash the lens therein. The apparatus further has an injection passage into which the fluid is injected into the cavity to thereby flow into the opening and to the cavities of lower trays in the vertical column.

Alternatively and more preferably, the apparatus comprises means for intermittently injecting fluid into said apparatus; and means for heating the injecting means to provide a consistent fluid temperature within a predetermined specified range. In the preferred embodiment a fluid is injected, more preferably via pulses into the uppermost tray onto the ophthalmic device by an extraction head (the injecting means) that comprises a nozzle, which will be described below. Further, the extraction head comprises heating means to insure that the temperature of the fluid to be injected remains constant and does not change between pulses. In the preferred embodiment the heating means is a flow-through extraction head. Maintaining the fluid at a high temperature, preferably close to the highest temperature that the ophthalmic devices can be subjected to without causing damage to the ophthalmic devices provides for increased removal of impurities from the ophthalmic devices as compared to the result if a fluid at a lower temperature is used. The injecting means with heating means is also beneficial for when there are interruptions in the operation of the apparatus due to jams or other maintenance needs in the manufacturing line for ophthalmic devices which requires that the injection of fluid onto ophthalmic devices be temporarily stopped.

Further features and aspects of the invention can be appreciated from the following detailed description and accompanying drawings.

OBJECTS OF THE INVENTION

It is an object of the invention to provide a novel method and apparatus for hydration and/or removal of impurities from ophthalmic devices.

A further object is to provide a contact lens hydration and/or washing method and apparatus in which the lenses are stacked vertically in trays which are moved upwardly, and a fluid flows downwardly in the tray stack to successively wash the lenses in the lower trays of the stack. The fluid may be introduced at the top of the stack or fresh fluid or a different fluid composition may be introduced at various points in the process and method.

An additional object is to provide a method and apparatus for efficiently washing ophthalmic devices in an apparatus in which the fluid cascades downwardly over the ophthalmic device.

Yet a further object is to hydrate and wash ophthalmic devices stacked vertically in a column using the same fluid.

Still a further object is to reduce the amount of water consumed during a hydration and/or washing phase.

Yet another object is to increase the rate of diffusion during a hydration and/or washing phase. One method to increase the rate of diffusion is to keep the fluid consistently hot at the injection point.

Still another object is to reduce the amount of lens handling as the lenses are brought to and removed from the hydration phase.

BRIEF DESCRIPTION OF THE DRAWINGS

Other objects and advantages of the present invention will become more apparent upon reference to the following specification and annexed drawings in which.

DETAILED DESCRIPTION OF THE PREFERRED EMBODIMENT

Figure 1:
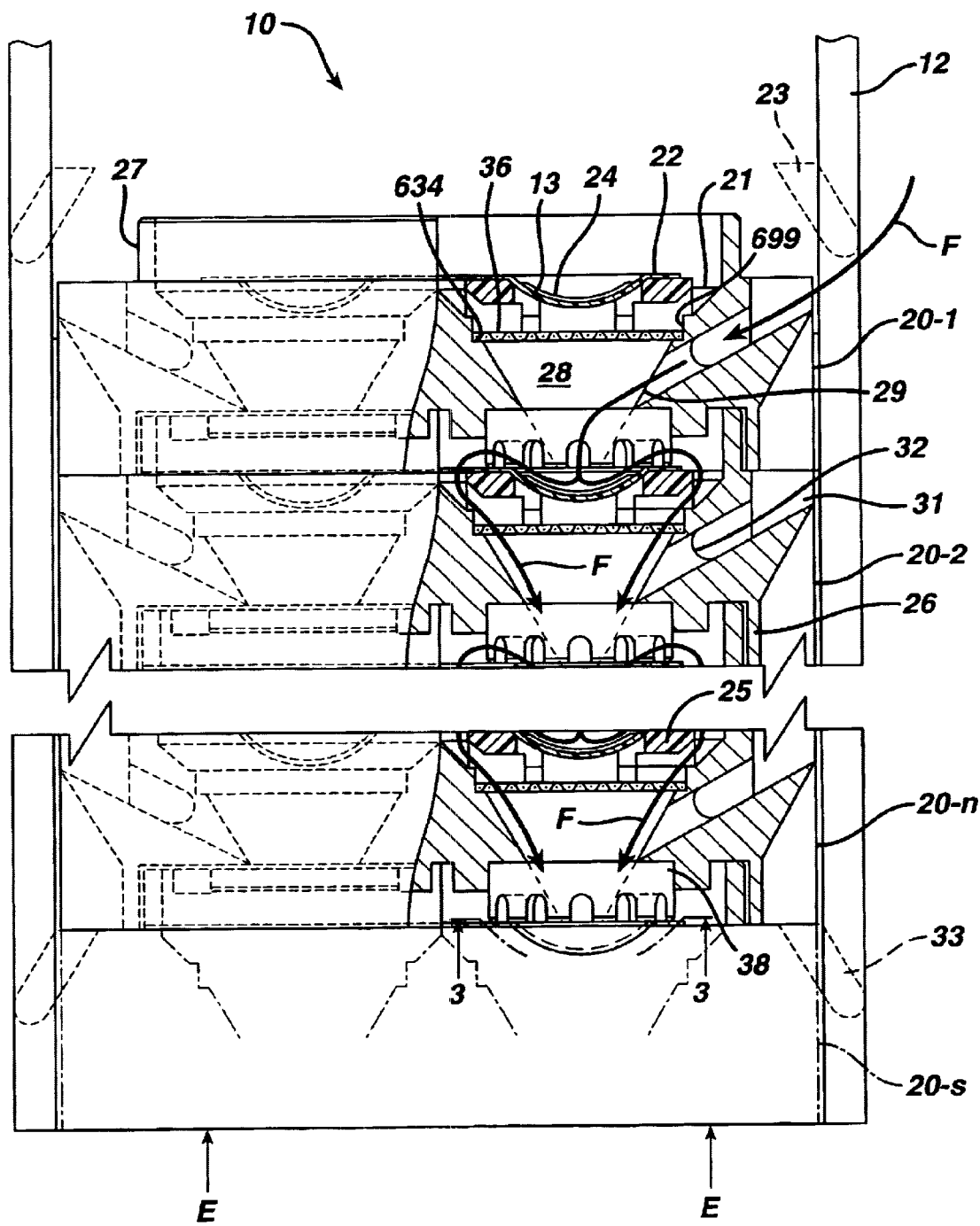
FIG. 1 is an elevational end view of a portion of a hydration apparatus according to the invention, with the end wall partially broken away to reveal a sectional view of a plurality of lens supporting trays therein.

Referring to FIG. 1, the hydration apparatus 10 has a frame 12 within which are stacked vertically a plurality of device-supporting members, preferably trays 20 made of a suitable material, such as plastic. Three such trays 20-1, 20-2, 20-n are illustratively shown. In a typical application, there can be as many trays as needed, preferably between thirty and fifty trays, more preferably forty trays stacked one above or on top of another.

Figure 2:
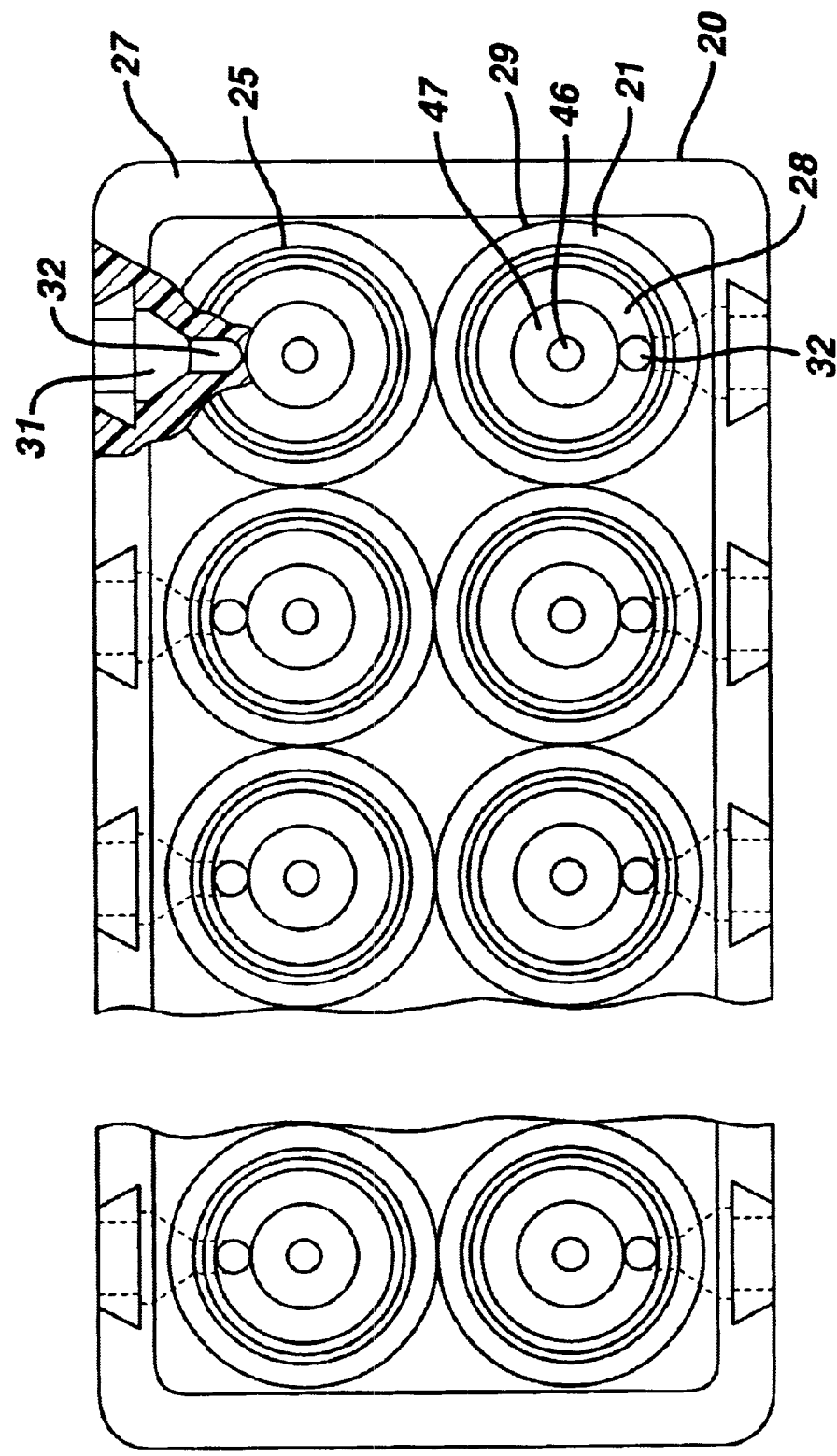
FIG. 2 is a top plan view of a portion of a tray which is conveyed through the apparatus of FIG. 1.

FIG. 2 shows a sectional, top view of a portion of one of the trays 20. The tray 20 is divided into an array of effective cavities 29, preferably 2×8, i.e., two wide and eight long, more preferably 4×8. These cavities may be bored through a solid plastic tray material, or molded into a plastic tray by injection-molding the tray. Alternatively, the tray having cavities may comprise machined, cast, or otherwise formed metal. Each cavity 29 in the tray 20 is preferably generally funnel-shaped through the tray with a wider opening where the lens 24 is held on one surface of the tray and a narrower opening on a second surface of the tray. The second surface of the tray is preferably provided with means for trapping a second lens when a second tray having a second lens is placed adjacent to, that is below, the first tray.

In one preferred embodiment shown in FIGS. 1 through 5, a lens support 25 of plastic or other suitable material is supported by (that is, placed in, attached to, or is an integral part of the tray) the tray within each cavity 29 of the tray 20. The preferred lens support 25 is a separate piece which fits into the top of the cavity 29. The lens support 25 is a circular aperture, or concave recess which supports a front curve mold 22 into which a lens 24 may be disposed. Alternatively, the lens can be supported in the lens support 25 without the front curve mold 22. In such an embodiment, the lens support 25 could have an alternative shape such as a bowl or cage.

A flow port 31 having a wide mouth provides access to a narrower fluid injection passage 32 which connects to the central portion 28 of the cavity 29, preferably below the lens support 25. The fluid injection passage 32 is preferably cylindrical in shape. A filter screen 36 is disposed within the cavity 29 in register with and below the lens support 25. The filter screen 36 catches any debris that may wash off the lens or front curve mold 22 to prevent blockage of the orifice 46 in the top chamber insert 38. The screen 36 is optional, depending upon the likelihood of undesired, removable pieces of material being present on the ophthalmic devices to be removed when washed or hydrated by the fluid. The bottom end of one cavity 29 communicates with top chamber insert 38. The top chamber insert 38 is preferably a separately machined or molded piece which is attached to the bottom of each cavity 29. In the preferred embodiment in a vertical stack of trays, the top chamber insert 38 of each tray, except the lowermost tray, is located adjacent to, that is, above each lens support carried by the tray directly below the top chamber insert 38.

Figure 3:
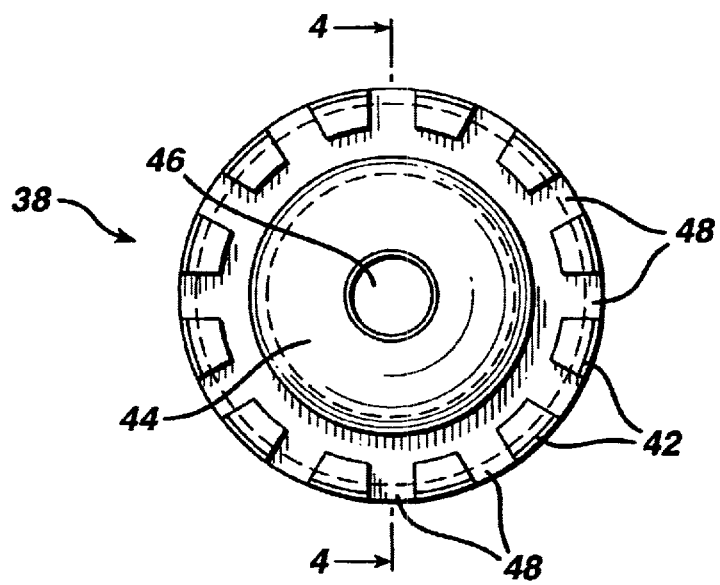
FIG. 3 is a top plan view of a top chamber insert which may be used in the present invention, taken along line 3—3 of FIG. 1.
Figure 4:
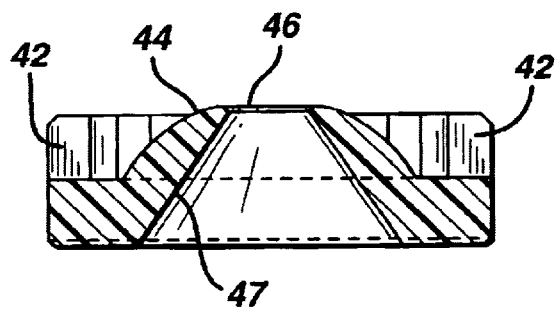
FIG. 4 is a sectional view taken along line 4—4 of FIG. 3.
Figure 5:
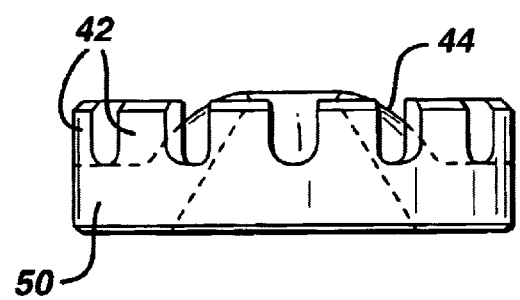
FIG. 5 is a side view of the top chamber insert.

As shown in FIGS. 3–5, the top chamber insert 38 comprises an annular ring 50 from which extends a plurality of spaced fingers 42 defining openings 48. During the hydration process the top chamber insert 38 is located directly over the front curve mold 22 and lens 24. Preferably the clearance between the spaced fingers of the annular ring and the front curve mold or other ophthalmic device in the tray below is 0.5 mm which is close enough to trap the lens and prevent the lens from fitting between the annular ring and the front curve, but enough space to allow impurities to be flushed off the lens. The top chamber insert 38 has a preferably convex central area 44. The top chamber insert 38 further comprises a tapered channel 47, and a central orifice 46 which direct fluid to the lens 24 in the tray 20 below. The fluid flows out of the central orifice 46 over the lens 24 through the openings 48 between the spaced fingers 42 and into the passages 21 adjacent to and below the lens 24. The chamber insert 38 prevents the lens 24 from being washed out of the front curve mold 22 and lens support 25 while directing the flow of fluid, and thereby protects the lens 24 and the front curve mold 22.

The trays are preferably stacked one above the other to form one or more vertical columns of lens cavities. Preferably, each cavity 29 of a tray 20 is physically isolated from the other cavities 29 of the same tray 20. Preferably the fluid flows in each vertical column of cavities from the top tray to the bottom tray. That is, for example, fluid injected into the cavity 29 via the flow port 31 and the injection passage 32 of the top tray 20-1 flows down in the column of cavities following the flow path shown by the arrows F in each cavity 29 of trays 20-1, 20-2 and 20-n. Alternatively or in addition to, fluid may be introduced to the cavities of the top tray 20-1 onto the lens or via flow passages 21. An embodiment of an injecting means which provides for the injection of fluid directly onto the lens in the uppermost device-supporting member will be further described in reference to FIGS. 11 through 14.

The fluid is directed to and flows generally downwardly from passages 21 and/or 32 into the cavity 29. As shown by F, the fluid flows through the central portion 28, through the tapered channel 47 and the central orifice 46 of the top chamber insert 38 to the lens 24, which may be seated in the front curve mold 22, within the lens support 25. The convex central area 44 of the top chamber insert 38 maintains both lens shape and lens position during the process. The central orifice 46 of the top chamber insert 38 is in register with the lens 24 in the cavity 29 of each lower tray 20 in the vertical column of trays. The fluid flows onto, over, and around the lens 24, over the front curve mold 22 (if present), through one or more openings 48 in the top chamber insert 38 of the tray 20 above, through flow passage 21, across the filter screen 36 through the central portion 28 of the cavity 29 and to and through the top chamber insert 38 of each cavity 29. As shown in FIG. 1, preferably the fluid flows out of the cavity 29, that is, through the central orifice 46 in a direction that is generally normal to the middle of the surface 19 of the ophthalmic device. Further, preferably the fluid strikes the ophthalmic device in the middle of the surface 19 of the ophthalmic device. As shown, the surface 19 is the back curve surface of a contact lens 24.

In the preferred embodiment, there is no cross-flow of fluid between the cavities 29 of a tray 20, this being prevented by design of the cavities in the tray. In the preferred embodiment, the fluid introduced into any cavity flows into the next cavity which is located directly beneath it in the stack.

Figure 9:
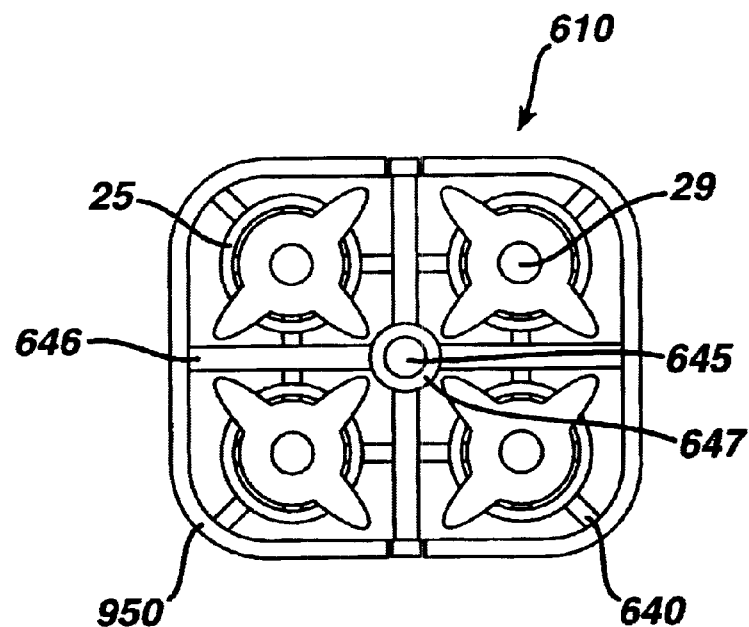
FIG. 9 is the top view of the cavity insert of the device-supporting member shown in FIG. 6.
Figure 10:
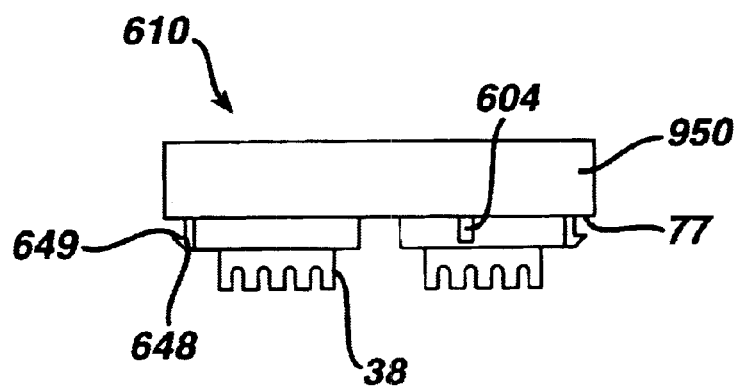
FIG. 10 is a side view of the cavity insert of the device-supporting member shown in FIG. 9.
Figure 11:
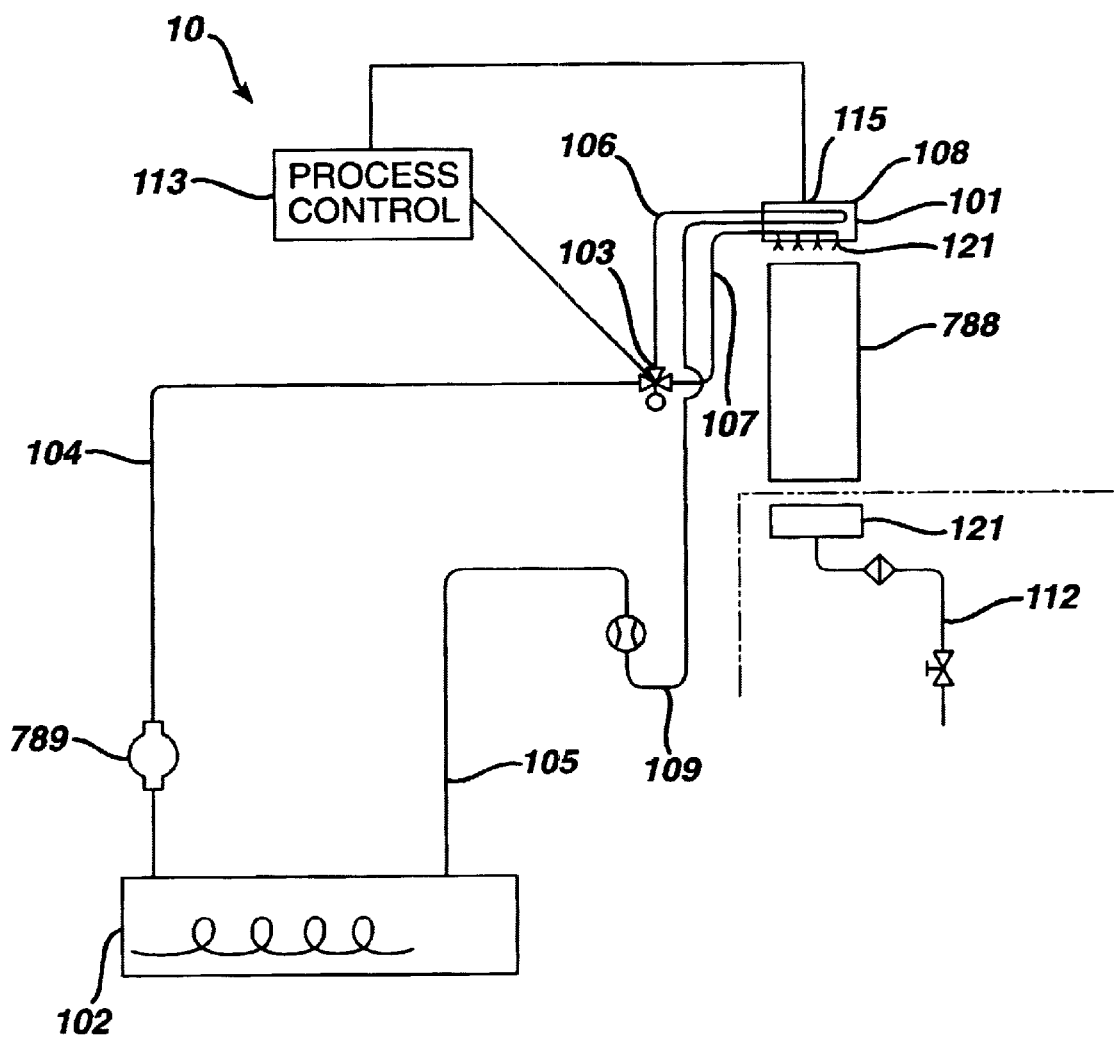
FIG. 11 is a schematic diagram of a hydration apparatus showing the system of fluid flow within the hydration or washing apparatus.

FIGS. 6 through 10 show the preferred device-supporting member of this invention, and like those shown in FIGS. 1–5, the device-supporting members may be used in alternative hydration or washing apparatuses, which have been described in the prior art and would be known to a persons of ordinary skill in the art; however, the most preferred hydration or washing apparatus is the one described herein and shown in FIGS. 1 and 11. The device-supporting member is preferably a tray 20 which comprises a support 600 and one or more cavity inserts 610 that contain one or more cavities 29, preferably two to ten cavities, more preferably two to eight cavities, most preferably four cavities per cavity insert 610. The support 600 preferably comprises any non-corrosive metal that is cast, machined, stamped, or otherwise formed, such as stainless steel, monel, inconel, and anodized aluminum. Additionally the support may comprise molded, e.g. injection-molded, or machined plastic such as polyphenylene oxide, polyphenylene ether, e.g. NORYL® made by GE Plastics, poly(oxy-1,4-phenyleneoxy-1,4-phenylenecarbonyl-1,4-phenylene) (PEEK) or other strong polymeric material. Additional materials are listed below.

The support 600 preferably is cast, machined, stamped or otherwise formed to provide voids 602 for the receipt of the cavity inserts 610. The support 600 shown in FIG. 8 comprises frames 601 defining voids 602 for receipt of the cavity inserts 610. In its simplest form the support is a single piece into which the voids 602 are formed. Preferably the support 600 provides a 2×4 array of the voids 602 for receipt of a 2×4 array of the cavity inserts; however, any number of voids may be formed as long as the support is strong enough to support the cavity inserts 610, and the number of voids also depends upon the size of the cavity inserts to be carried. Preferably from 8 to 64, more preferably 12 to 48 and most preferably 12 to 36 ophthalmic devices are supported by a single tray 20, or device-supporting member. The number of cavity inserts on the support will depend on the number of ophthalmic devices carried by each cavity insert which was described above. In the most preferred embodiment, there are 4 cavities in each cavity insert, and each support carries eight cavity-inserts; however, two to sixteen cavity inserts are preferred.

Figure 6:
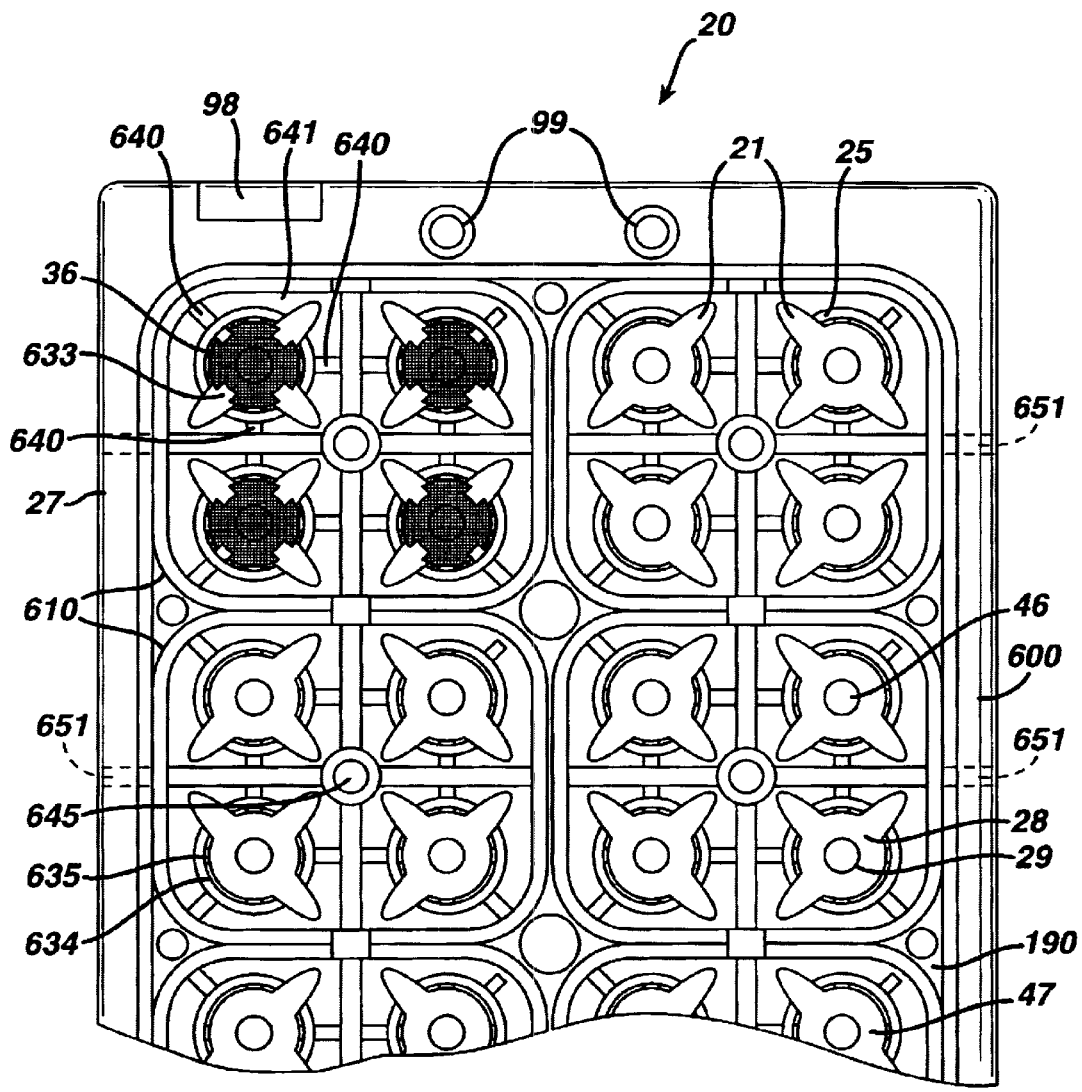
FIG. 6 is a top plan view of a portion of an additional embodiment of a device-supporting member that is conveyed through the hydration or washing apparatus.
Figure 7:
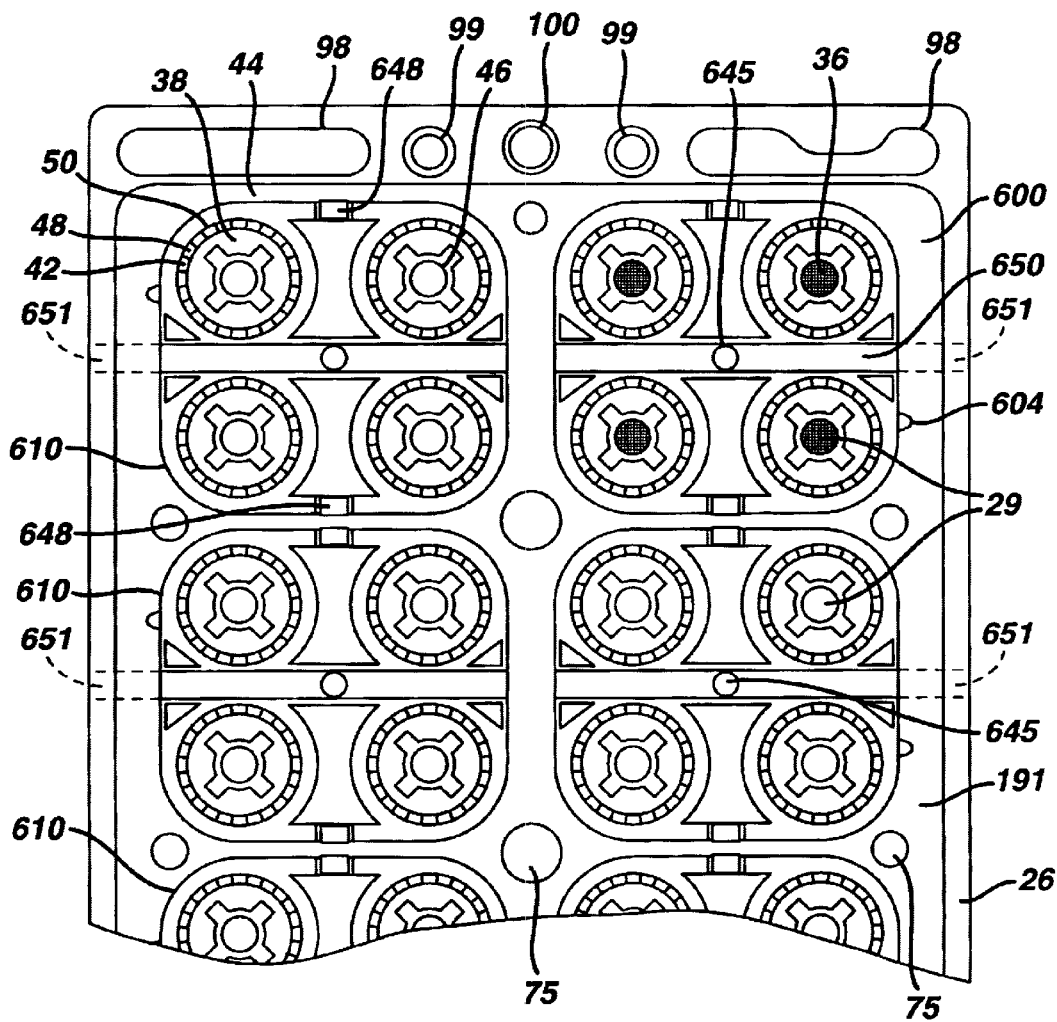
FIG. 7 is a bottom plan view of the device-supporting member shown in FIG. 6.
Figure 8:
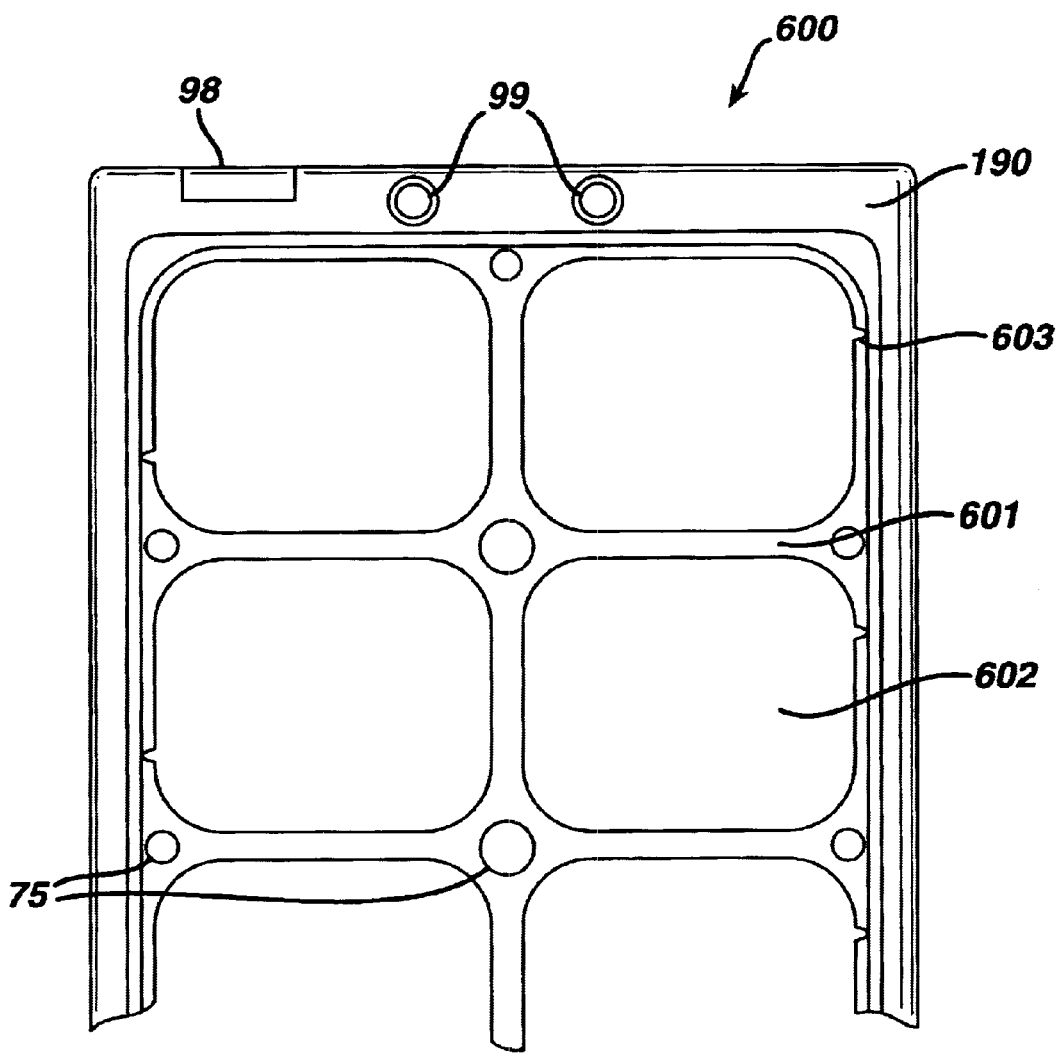
FIG. 8 is a top view of the support of the device-supporting member shown in FIG. 6.

Each cavity insert 610 is preferably injection-molded as a single piece, except for the optional screens 36 (shown in one cavity insert in FIGS. 6 and 7). Alternatively, the cavity insert 610 may comprise individually formed elements, preferably injection-molded elements which can be snapped, attached via adhesive or screwed together; however, preferably each cavity comprises no more than four individual elements, more preferably no more than three individual elements, and most preferably no than two individual elements that are assembled or attached together to form the cavity. In the preferred embodiment each cavity insert comprising four cavities is injection-molded in a single mold, and then if desired the screens are placed in each cavity.

In the preferred embodiment the screen 36 is a metal screen, preferably laser-cut but could be stamped, machined or otherwise formed, each having four cutouts 633 for placement of the screen 36 onto a ridge 634. The cutouts 633 are sized to fit around tabs 635 which protrude from the inside wall 699 (shown in FIG. 1) of the cavity 29. After the cutouts 633 clear the tabs 635, the screen 36 is seated on ridge 634. The screen 36 is turned between 10 and 80 degrees so that the cutouts 633 are not lined up with tabs 635. The screen 36 is held in place between ridge 634 and tabs 635, because the tabs 635 are preferably formed to allow only enough space between the bottom of the tabs 635 and the ridge 634 for the thickness of the screen, which does not allow for any movement of the screen while the cavity insert is in use in the hydration or washing apparatus 10.

The cavity insert shown in more detail in FIGS. 9 and 10 preferably have four cavities 29 for receiving four ophthalmic devices (not shown in FIGS. 9 and 10); however, the cavity inserts could be formed with any number of cavities to hold any number of devices, preferably from 1 to 32, more preferably 2 to 12, most preferably 4 to 6. It is more preferred that the cavity insert has multiple cavities and supports multiple devices, preferably one device in each cavity. The device-supporting member can comprise an injection molded cavity insert without a support which can operate as the tray as shown in FIGS. 1 to 5. Many of the elements shown in FIGS. 1–5 and described earlier, including the flow of fluid through the cavities as described, are present or are applicable to the tray 20 and cavity inserts shown in FIGS. 6–10. (Similar elements are labeled similarly.) The cavities have a lens support 25, passages 21, screen 36, central portion 28, and top chamber insert 38. The elements of the two embodiments may have slightly different shapes; however the function is the same, e.g. the top chamber insert 38 shown in FIG. 7 has a smooth cross-shaped convex central area 44, whereas the convex central area of the embodiment shown in FIGS. 3–5 has a rounded convex central area 44; however, both convex central areas are located just above the ophthalmic device and hold the ophthalmic device in place during washing or hydration.

The cavity inserts 610 comprise side walls 950, chamber dividers 646 which prevent flow between the separate cavities and defines basin 641 which directs the fluid that flows off of the ophthalmic devices (not shown) to the various passages 21. Triangular slides 640 are provided from the side wall 950 which increase in thickness toward the lens support 25 to assist in the proper placement, centering and retention of the ophthalmic device on the lens support 25. In the preferred embodiment, the side walls 950 are the same height as the chamber dividers 646. The cavity insert has an air hole 645 surrounded by a slightly depressed area 647 in the chamber dividers 646 to avoid the formation of a vacuum and to provide for the flow of air into the cavities and the flow of fluid through the cavities 29. Air moves into the air hole 645 via a bore 651 through support 600 which provides air to cutaway 650 on the bottom of the cavity insert 610. The alignment of the bore 651 and the cutaway 650 is important to the flow of air and fluid into and through the cavities 29; therefore, a notch 603 in the support 600 is provided for receipt of an insert orientation feature 604 (shown in FIG. 7) on the cavity insert for proper placement of the cavity inserts in the support 600.

To removably hold the cavity inserts 610 to the support 600, catches 648 are provided on two sides of the cavity insert which when the cavity inserts are placed in the voids 602 the catches 648 snap into place. As shown in FIGS. 6, 7 and 10, when the support 600 and the cavity insert 610 are assembled, the step 77 of the cavity insert 610 sits against the top surface 190 of the support 600, and surface 649 of the catches 648 which flex when the cavity insert 610 is being pushed into the support 600, sits against the bottom surface 191 of the support 600 when the cavity insert 610 is in place in the support 600. More preferably, although not shown, the support 600 and the cavity insert 610 may be held together by screws, brackets, or bolts, most preferably by screws.

The support has hog outs 98, and holes 75 to lighten it without sacrificing strength which makes the support easier to handle. The hog outs 98 may also be formed to be sensed by sensors within the apparatus 10. The support is provided with a label 100 which may be an inductive chip or bar code for tracking which has been described in "METHOD AND APPARATUS FOR SKU TRACKING AND CHANGEOVER", Ser. No. 09/305,885, filed May 5, 1999, fully incorporated herein by reference. The support comprises one or more bushings 99 which receives pins which are used for proper placement of the extraction head shown in FIGS. 12–16 and more fully described below.

The benefit of the tray having a support and cavity inserts is that if one or more cavity inserts were to break then only the damaged piece would have to be replaced. Further, when the cavity inserts are injection molded, they are significantly cheaper than a machined or otherwise formed part, either metal or plastic.

The cavity insert, tray, support or other device-supporting member may comprise any suitable plastic materials include polystyrenes, polyolefins, acrylics, polycarbonates, polyacetal resins, polyacrylethers, polyacrylether sulfones, polyphenylene oxide, polyphenylene ether, e.g. NORYL® made by GE Plastics, PEEK, and nylons. The preferred materials must be able to withstand high temperatures, de-ionized water and surfactants, and preferably are non-leachable and non-toxic. The most preferred material is an amorphous thermoplastic polyetherimide, preferably ULTEM HTX2000F made by General Electric which can withstand the solvents and washing solution within the temperature range utilized.

The trays 20 are fed into the apparatus 10 from the bottom and removed from the top. The stack 788 of trays are indexed up when a new tray is inserted at the bottom and lifted into the stack, preferably at the same time one tray is removed from the top of the stack as shown in FIG. 1. In the preferred embodiment, these actions are controlled by mechanically driven devices and latches, together which lift and index up the stack of trays. Support and proper placement of the trays in the stack is preferably aided by a structure or tray shape, e.g. an undercut 27 on the top of each tray which fits into a complementary structure or shape, e.g. a lip 26 on the bottom of each tray.

After lenses 24, preferably in front curve molds 22, are placed into each lens support 25 on top of a tray 20, the tray 20 is introduced into the bottom of the stack 788 shown in FIG. 1. Before introduction of the tray into the stack, the stack of trays are supported by multiple latches 33 attached to the frame 12 located below the lowermost tray 20-n. Beneath the lowermost tray 20-n supported by latch 33 is a is space for insertion of a tray 20-S shown in phantom lines. Beneath the space 20-S is an elevator type mechanism illustrated by the arrows E. Once tray 20-S is properly located beneath tray 20-n, the elevator mechanism E moves the tray into the stack, indexing the stack up one position. Tray 20-n will move into the level in which tray 20-n is shown and the top tray shown as 20-1 is indexed up and disengaged from the stack via latches 23 which are attached to the frame 12 above the top of the stack. The disengaged tray which carries lenses which have completed the hydrating and/or washing process can then be removed from the apparatus 10 and placed into an area for further processing, such as packaging.

The latches are preferably attached to the frame and are preferably spring-loaded latches which support the bottom tray and the tray removed from the stack. The latches are actuated by the elevator which raises the stack of trays above the spring-loaded latches and then the stack is lowered down onto the latches. Alternatively, latches can be located on the trays with openings or cogs in the frame 12 to support the stack of trays. In the preferred mode, the latches are of the mechanical type, for example, the spring loaded type. Alternatively, any suitable mechanism(s) can be used to support and move the trays 20 upwardly within the apparatus 10.

In one of the preferred embodiments, fresh DI-water is used as the hydrating and leaching fluid and is directed as a pulsed stream into each fluid port 31 of the tray 20 at the top of the stack and flows through the fluid injection passages 32 of the top tray 20-1. This occurs at a point below the lenses 22 in the top tray. Alternatively or in addition to, fluid can be added to the apparatus 10 by dripping or injecting it onto the top lens 24 in the top tray of the stack. The fluid flows through each cavity 29 in the stack as described earlier. The DI-water cascades down the is columns of cavities of the tray stack allowing the lenses 24 to absorb water for lens release from the front curve mold 22, exchange the fluid for extraction of diluents (impurities), and/or hydrate or other processing of the lenses.

As can be appreciated, the lenses supported on each tray added to the stack will contain more impurities than the lenses supported on the last of the previously added trays, which moves up with the addition of another tray. As each tray rises up the stack, it is subjected to further and additional hydrating and/or washing, and such tray will have undergone more hydrating/washing than a newly added tray. However, for an uninterrupted process, for all the trays which leave the stack, for example, to proceed to a packaging process, the lenses on those trays will have experienced the same amount of hydration and/or washing. It is preferred that at least that all trays will receive a required minimum amount of hydration and/or washing, and it is possible due to a stoppage in the indexing of the trays that some trays will remain in the apparatus longer than others and will receive additional washing.

The hydrating and/or washing solutions, solvents, fluids, liquids, gases, or vapors, which may contain surfactants or other processing aids are all referred to herein as fluids. The fluid for the process is preferably heated in an on-line tank or heater 102 shown in FIG. 11, and is preferably DI-water having a small amount of Tween-80, a surfactant. In one embodiment, the DI-water is delivered to the fluid port 31 of the top most tray by means of a manifold fed from insulated tubing (not shown) at a relatively high temperature, e.g. 85–95° C., but a temperature that does not affect the lens, and is monitored to ensure proper temperature and flow rate for processing control. The high temperature increases the thermal energy and the diffusion rate, and minimizes processing time. Water flowing out of the bottom of the stack is is directed through a heat exchanger (not shown) to recover energy by heating incoming water and cooling the outflow before proceeding to a drain or recycle reservoir.

While the invention has been described as injecting the fluid into the uppermost tray 20, fluid also can be injected at the same time into one or more trays at lower levels. For example, the same fluid or some other fluid e.g. solvent can be injected at a lower tray, e.g., the next to lowest tray to wash the lenses in the lowest tray, which have the highest level of diluent or impurities on the lenses. The fluid added at lower tray levels can replace or be in addition to the fluid from the upper trays.

In the preferred embodiment of the invention, DI water is the fluid, and it is pulsed onto the lens in the front curve on the top of the stack through an extraction head that delivers from 9 to 16 ml, more preferably from between from 11 to 13 ml of DI water to each lens and then stops until the majority of pulsed fluid in the uppermost tray drains from the cavities within the uppermost tray into the cavities directly beneath in the next tray. The amounts of DI water may vary depending upon the type of ophthalmic device, the number of pulses, and the residence time of the ophthalmic devices in the apparatus. In the preferred embodiment, if there are no stops in the apparatus due to a jam or the like, the fluid is pulsed for from 3 to 10 seconds, then turned off for from twenty to thirty seconds and then the trays are indexed up. If there is an interruption in the indexing, the fluid is pulsed on every thirty seconds for 3 to 10 seconds to keep the lenses wet. Preferably after each pulse ends and before another begins, the uppermost tray is removed from the stack and a lowermost tray is added to the stack 788. Once the trays in the stack have stopped moving, the extraction head delivers a determined amount of clean fluid in a pulse to the uppermost tray in the stack again, and the process of indexing up, removal of the top tray, and addition of a new bottom tray is repeated again.

In the preferred embodiment to prevent the extraction head from cooling between delivery of the fluid in pulses to the uppermost tray that will result in the delivery of fluid at a lower temperature than the temperature needed to provide properly cleaned lenses, a heating means is provided to heat the extraction head when the fluid is not flowing through it. The heating means can be an electric heating coil, a cartridge heater, heat exchanger, steam by-pass wrapped around or through the extraction head to maintain it between 85–95° C., most preferably 90° C. More preferably a flow-through extraction head is used. The preferred heating means is a flow-through extraction head that heats the extraction head by circulating heated fluid around the extraction head. In the preferred embodiment the heated fluid that is circulated around the extraction head is a portion of the heated fluid that would otherwise be injected onto the uppermost tray in the stack except that is presently not being injected into the uppermost tray in the stack. In the preferred embodiment there is a three-way valve located in the pipe before the extraction head. The three-way valve either directs fluid flowing from the heater out of the extraction head onto lenses in the hydration or washing apparatus or alternatively through a pipe to passageways preferably within the extraction head that eventually returns the fluid back to the heater tank via a pipe for the fluid.

The preferred embodiment of a flow-through extraction head 101 is shown in FIGS. 11 through 16. The flow-through extraction head 101 preferably comprises a layered manifold 115 and at least one nozzle 121, preferably a plurality of nozzles 121, preferably a nozzle for every cavity in the uppermost tray in the stack 788 to which the extraction head injects fluid. FIG. 11 shows a schematic of the apparatus, particularly the system of fluid flow in the apparatus 10. The hydration or washing apparatus 10 of the invention comprises a fluid heater 102, the three-way valve 103, the flow-through extraction head 101, and the stack 788 of trays (not shown). The apparatus 10 further comprises a pump 789, sink 121 for collection of the fluid that exits the stack 788 and piping, channels, hoses, and other fittings to move the fluid in, around and out of the apparatus 10. The apparatus 10 may further comprise a fluid reservoir (not shown) which provides fluid to the heater 102.

Fluid that is heated to 90° C. in the heater 102 travels via pump 789 in pipe 104 to valve 103. When the process controls 113 for the hydration and/or washing apparatus 110 determine that the apparatus requires a pulse of the fluid, the valve 103 is actuated to allow the fluid to flow through the valve 103 and into pipe 107 into layered manifold 115, through the layered manifold 115 to nozzles 121, and onto the ophthalmic products in the top tray in the stack 788 in the hydration and/or washing apparatus 10. At the end of a pulse of fluid, as determined by the process controls 113 for the apparatus 10, the three-way valve 103 is actuated to direct the fluid from pipe 104 (from the heater 102, via pump 789) to pipe 106 which is connected to the passageways 108 which are, in the preferred mode, bored into one or more layers (in the preferred embodiment one layer) of the manifold 115 of the extraction head 101. (The passageways are shown in more detail in FIG. 16, and the extraction head is shown in more detail in FIGS. 12–16.) Alternatively, the passageways could comprise conductive tubing on the exterior of the manifold 115.

Figure 12:
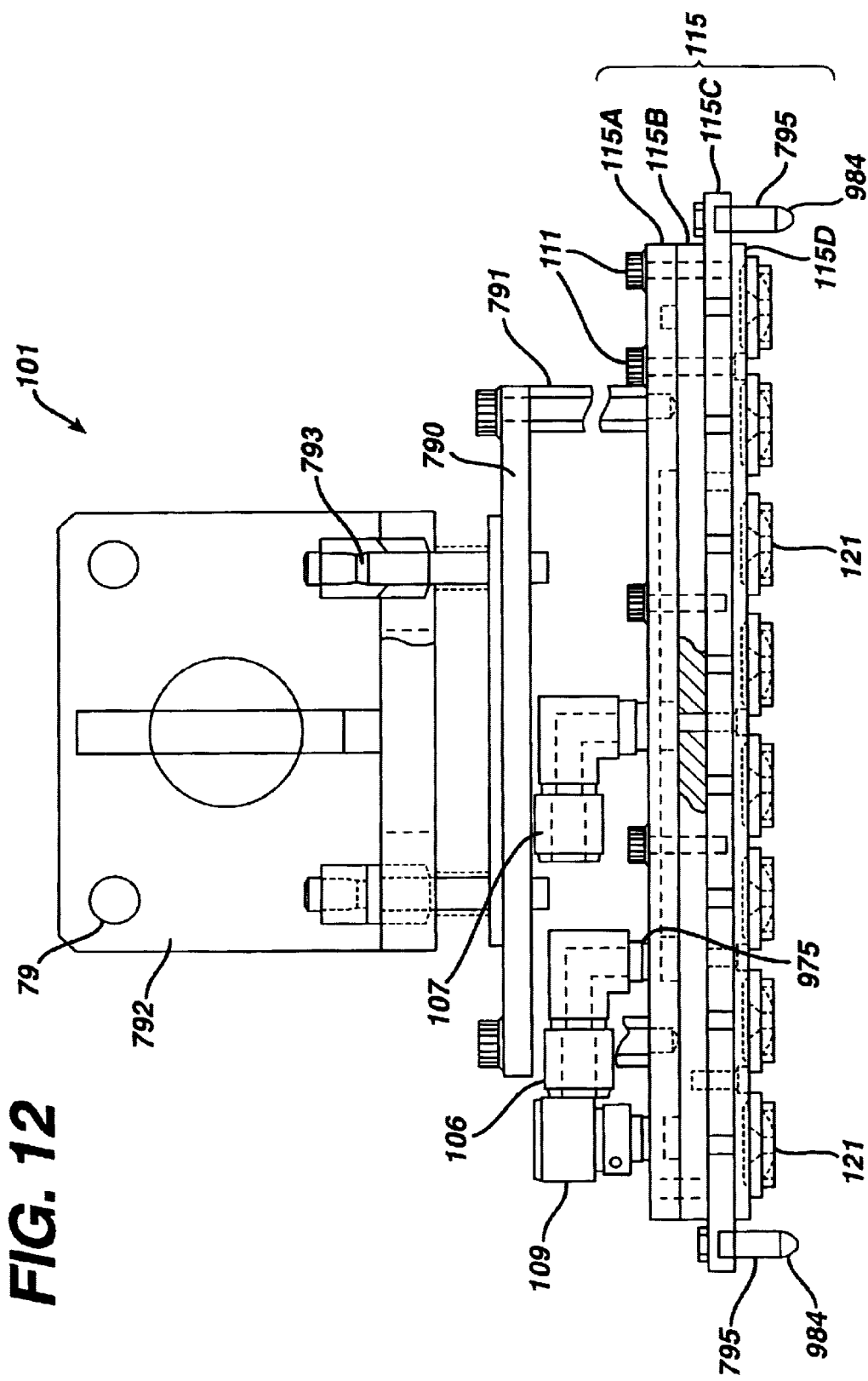
FIG. 12 is a side view of the preferred flow-through extraction head shown in FIG. 11 showing the layered manifold.
Figure 13:
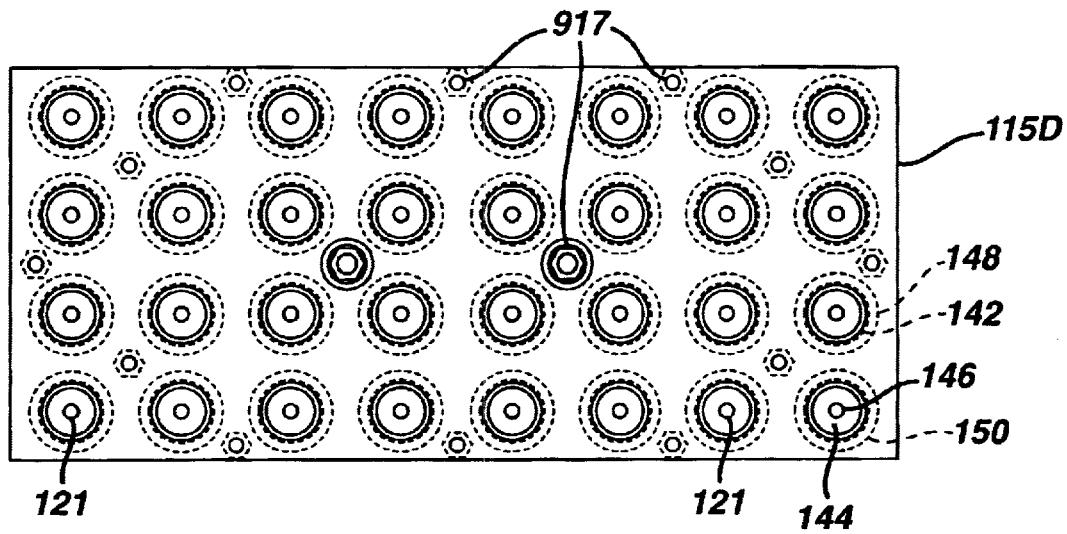
FIG. 13 is a bottom view of a flow-through extraction head and bottom view of layer 15D of the layered manifold shown in FIG. 12.
Figure 14:
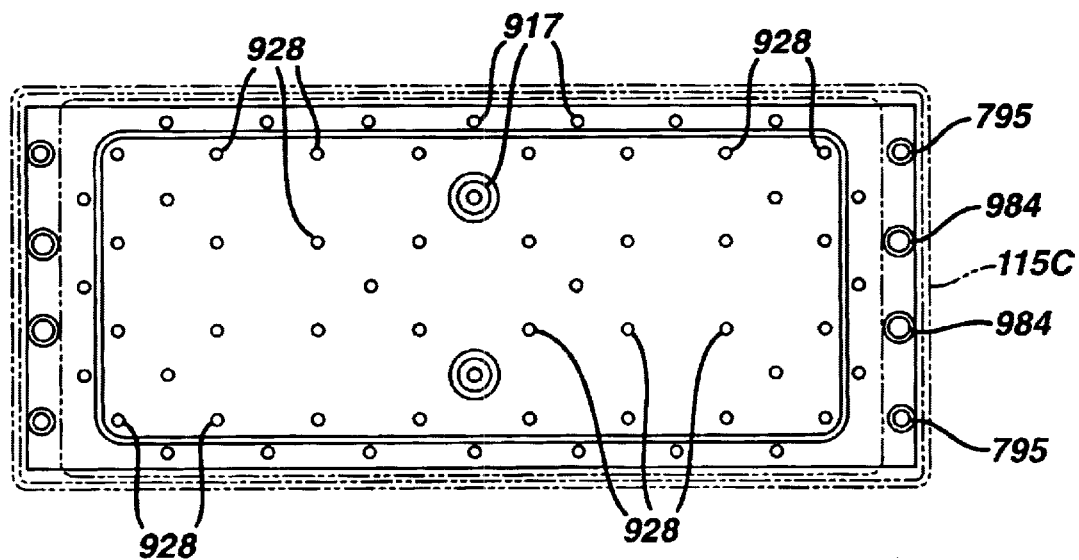
FIG. 14 is a bottom view of layer 15C of the layered manifold shown in FIG. 12.
Figure 15:
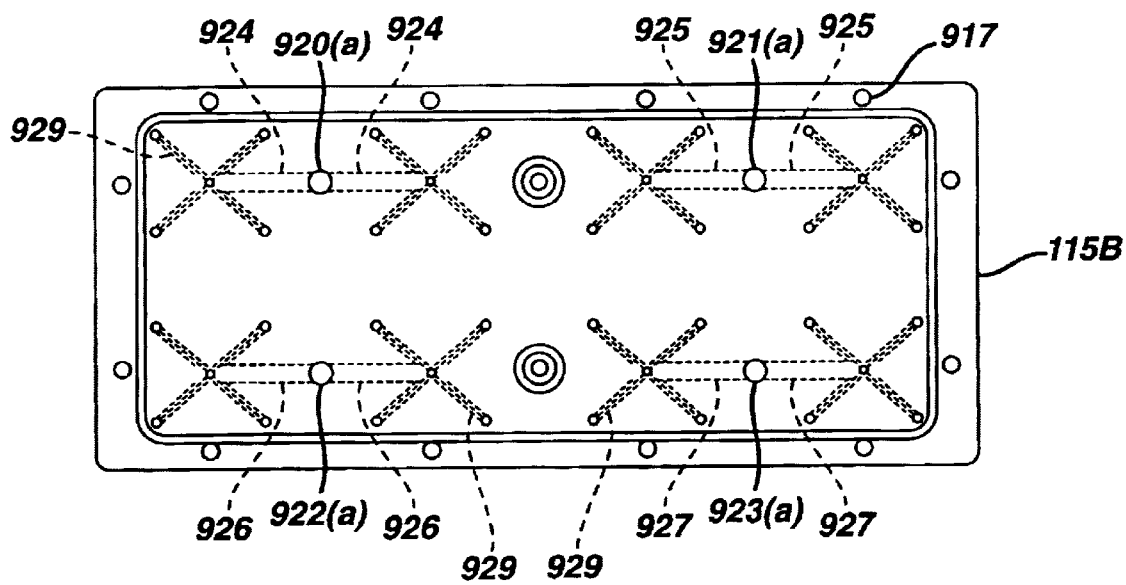
FIG. 15 is a bottom view of layer 15B of the layered manifold shown in FIG. 12.
Figure 16:
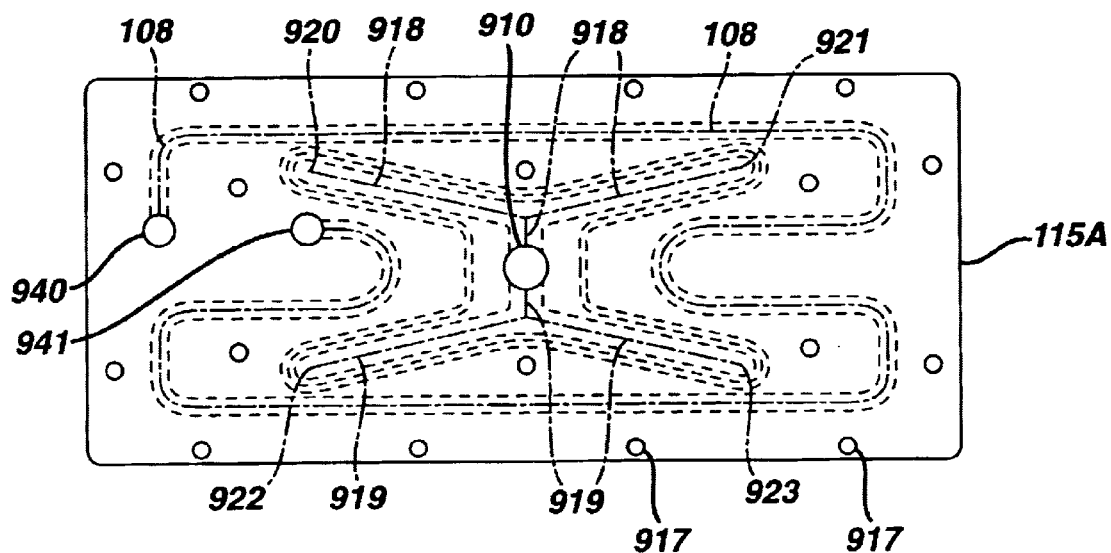
FIG. 16 is a bottom view of layer 15A of the layered manifold shown in FIG. 12.

In the preferred embodiment, the extraction head comprises a layered manifold 115. The layers 115A, 115B, 115C, and 115D of the manifold preferably comprise pieces of metal into which holes and channels are bored so that conduits for the fluid are formed when the metal pieces are assembled into the manifold and held together by bolts or screws 111. The layers of the manifold are shown in FIGS. 13–16. The manifold 115 is formed from four discreet layers or plates 115A, 115B, 115C and 115D. The first layer 115A, which is the bottommost layer of the manifold, which engages the uppermost tray in the stack during injection of fluid is shown in FIG. 13. The second layer adjacent to the first layer, and between the first and third layer is shown in FIG. 14. The third layer, between the second and forth layers is shown in FIG. 15, and the fourth and top layer is shown in FIG. 16. The layers of the manifold are secured together by a plurality of screws 111, four of which are illustrated in FIG. 12, which extend through a plurality of commonly aligned openings 917 for a threaded engagement with the layers of the manifold 115. As illustrated in FIGS. 13–16, many such screws and other fasteners are used, several of which are referenced with reference numeral 917. As illustrated in FIGS. 12 and 16, fluid enters from fluid line 107 into the fluid port 910 and is distributed by channels 918, 919 that are milled or cast into the under surface of the top level 115A to be distributed to four distribution points 920–923. From distribution points 920–923, the fluid travels through plate 115B by virtue of holes drilled in plate 115B at 920(a)–923(a) to a second set of milled or cast channels 924–927 to eight cross manifolds 929 which are milled or cast in the underside of layer 115B, and provide distribution to thirty-two vertical bores 928 drilled through plate 115C which terminate in nozzles 121 which are attached to level 115D, as illustrated in FIGS. 12 and 13.

Any features not described regarding the extraction head are similar to the nozzles and layered manifolds that are described in Anderson et al., U.S. Pat. No. 5,476,111, issued Dec. 19, 1995 incorporated herein by reference.

The fourth layer 115A shown in FIG. 16 shows passageway 108 formed or milled onto the underside of layer 115A. Pipe 106 is connected to passageway 108 via a fitting 975 and a bore 941 through layer 115A. Passageway 108 allows fluid to travel between plate 115A and plate 115B, and then the fluid exits the passageway 108 via bore 940 to hose 109 which returns the fluid to the heater 102. The passageway 108 is shown as only flowing between two layers of the layered manifold; however, if desired the passageway could have included additional bores and channels for additional circulation of the fluid through additional layers of the manifold 115 if desired.

The manifold 115 comprises metal layers to which preferably plastic nozzles 121 are attached preferably by pressfitting; however, other materials could be used such as metal or plastic for the layers and nozzles. The extraction head comprises nozzles 121. There is preferably one nozzle 121 for each of the cavities in the top tray. Preferably the nozzles 121 are shaped like the top chamber inserts which were previously described in connection with FIGS. 3, 4, and 5. Like the top chamber insert 38, the nozzles 121 comprise a convex central area 144, central orifice 146 from which the fluid is pulsed, annular ring 150 from which extend spaced fingers 142 and openings 148. In the preferred embodiment, when the extraction head 101 is positioned over the uppermost tray, the extraction head 101 appears to the uppermost tray to be the bottom side of another tray.

As shown in FIG. 12 the extraction head comprises the manifold 115, and nozzles 121. Further, the manifold 115 is rigidly mounted onto a plate 790 via four bolts 791. The plate 790 is mounted onto an L-shaped bracket 792 via four springs 793. To provide for the movement of the extraction head 101 the bracket 792 is attached via bolts or screws 794 to a servo driven linear actuator (not shown). The servo driven linear actuator is controlled by the process controls 113 for the apparatus 10 and moves the extraction head onto and off of the uppermost tray in the stack.

After the stack is moved up and the uppermost tray is lifted off the stack by catching it on the latches, and removed via a second servo (not shown) the extraction head 101 moves down to a position just above or in contact with the uppermost tray. In the preferred embodiment pins 984 (preferably, two on each end) on the extraction head 101 engage bushings 99 in the tray 20 to insure the proper alignment of the extraction head 101 with the tray 20, and the proper alignment of the nozzles 121 with the cavities 29. Preferably the extraction head is mounted on a compliance mechanism (the four springs shown in FIG. 12) which allows the servo to overdrive the tray to provide that four stop pins 795 located at each corner of the extraction head 101 rest on surface 190 of the uppermost tray 20. The process of overdriving the tray and causing stop pins to meet the surface of the tray provides that the extraction head 101 is parallel with, that is, on the same plane as the tray it is in contact with. At this point, the fluid is pulsed onto the ophthalmic products in the uppermost tray. After a set amount of pulsing, the process controls 113 actuates the three-way valve 103 (to provide for the circulation of fluid in passageways 108 within the manifold 115) and directs the servo to drives the extraction head up away from the uppermost tray allowing room for the uppermost tray to be indexed onto the upper latches 23 of the apparatus 10 for removal from the stack 788. After removal of the tray from the upper latches, the process of injecting fluid is repeated as just described.

Alternatively a pneumatic cylinder could be used to move the extraction head into and out of position for pulsing the uppermost tray in the stack with fluid.

Although the flow-through extraction head has been described in reference to this particular hydration and/or washing apparatus, it could be used in any hydration and/or leaching apparatus that provides a pulsed injection of fluid.

In essence, lenses 24 disposed in the front curve molds 22 of a tray 20 enter the bottom of the stack and they are moved in a timed and stepped manner to the top of the stack. During the upward movement, cascading fluid from the upper stages removes the residual diluents, monomers and/or impurities from the lens 24 and/or releases the lens 24 from the mold 22. This provides a counter-current leaching system. Preferably high temperature DI-water (fluid) is directed onto the lens disposed within each of the front curve molds 22 or otherwise within the lens supports 25. Lens release from the front curve mold 22 occurs substantially simultaneously with initial extraction of the leachables. Continued exposure of the lens to DI-water in the front curve mold 22 will remove the leachables, completing the extraction. DI-water flow rates are controlled to ensure good displacement of the DI-water volume in each cavity. The flow rate is also critical to maintain a low temperature gradient down the stack. Injected DI-water is fed from hypodermic tubes or in the preferred embodiment by an extraction head, and may be continuous or pulsed (semi-continuous). Pulsed flow produced the lowest water consumption that still provided acceptable results.

A significant improvement in lens through-put and yield is obtained by minimizing the lens material handling. In the preferred hydration and washing apparatus and method of the invention, once the lenses are placed in the lens support 25, the lenses (or front curve molds) are not handled during the process.

Typically, about 125 to about 250 ml/minute of distilled water is provided in pulsed or continuous flow to hydrate and clean approximately 40 lenses in one column of cavities traveling through the vertical hydrating stack. This method and apparatus provide useable lenses in approximately but not less than 12 minutes while using approximately but no less than 500 ml of distilled water per lens.

As used herein, the term "injected" refers to the introduction of a fluid to the apparatus, and includes fluid introduction under pressure, in a stream, droplets, continuous and intermittent flows, and fluid injected in the form of a vapor. Also, the term "impurities" refers to processing chemicals such as leachable diluents and monomers which are ordinarily washed away from a manufactured contact lens prior to packaging.

All patents, applications, publications, and the method mentioned herein are hereby incorporated by reference.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A hydrating or washing apparatus for ophthalmic devices comprising:

a) injecting means for applying a fluid to an ophthalmic device, the ophthalmic device being supported by a device-supporting member, and b) heating means for said injecting means which heats said injecting means when the injecting means is not applying a fluid to said ophthalmic device to maintain said injecting means at a predetermined temperature.

2. The apparatus of claim 1 wherein said injecting means pulses said fluid and said heating means heats said injecting means when said injecting means is not pulsing fluid to said ophthalmic device.

3. The apparatus of claim 1 wherein said heating means is an electric heater.

4. The apparatus of claim 1 wherein said injecting means comprises an extraction head.

5. The apparatus of claim 4 wherein said extraction head comprises a manifold and nozzles.

6. The apparatus of claim 1 wherein said injecting means pulses said fluid in said apparatus.

7. The apparatus of claim 1 wherein said means for heating comprises a flow through extraction head.

8. A method of hydrating or washing ophthalmic devices, comprising the steps of injecting a fluid to an ophthalmic device via an injecting mean, the ophthalmic device being supported by a device-supporting member, and heating the injecting means when the injecting means is not applying a fluid to an ophthalmic device to maintain said injecting means at a predetermined temperature.

9. The method of claim 8, wherein said heating step is accomplished by the step of heating the exterior of said injecting means.

10. The method of claim 8, wherein said ophthalmic devices are contact lenses.

11. The method of claim 8, wherein said ophthalmic devices are reusable molds.

12. A hydrating or washing apparatus for ophthalmic devices comprising:

a) injecting means for applying a fluid to an ophthalmic device, said injecting means comprising an extraction head, said extraction head comprising a manifold and nozzles; and b) heating means for said injecting means which heats said injecting means when the injecting means is not applying a fluid to said ophthalmic device to maintain said injecting means at a predetermined temperature;

c) a three-way valve; and d) a heated reservoir of said fluid, said three-way valve switches between a first position that directs fluid from said heated reservoir through said manifold through said nozzles to said ophthalmic devices and a second position that directs fluid from said heated reservoir through said manifold back to said heated reservoir.

13. A method of hydrating or washing ophthalmic devices, comprising the steps of injecting a fluid to an ophthalmic device via an injecting means; and heating the injecting means when the injecting means is not applying a fluid to an ophthalmic device to maintain said injecting means at a predetermined temperature, wherein said heating step is accomplished by the step of actuating a three-way valve connected between a fluid heater and the injecting means to cause fluid to circulate within said injecting means.

* * * * *